Figure 1:
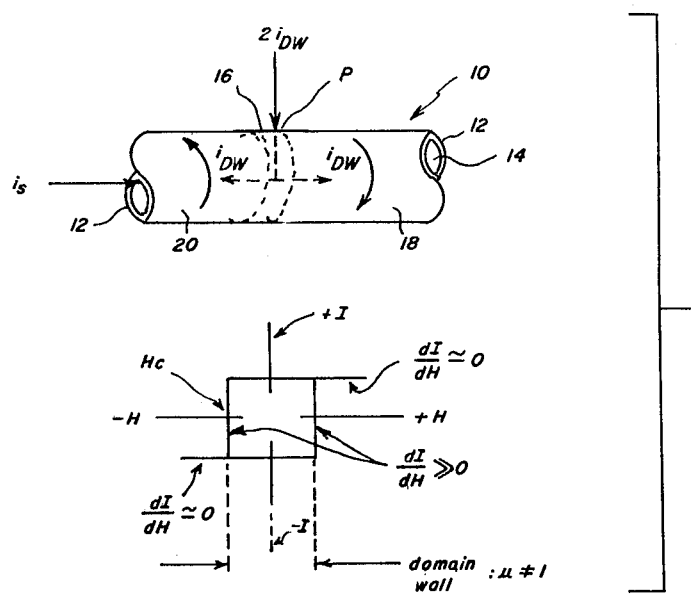

United States Patent [19]

Jeffers

[11] 4,414,595

[45] Nov. 8, 1983

[54] SCANNING MAGNETIC HEAD WITH PROPAGATING DOMAIN WALL

[75] Inventor: Frederick J. Jeffers, Escondido, Calif.

[73] Assignee: Eastman Kodak Company, Rochester, N.Y.

[21] Appl. No.: 289,846

[22] Filed: Aug. 3, 1981

[51] Int. Cl.³ .............................................. G11B 5/12
[52] U.S. Cl. .................................................. 360/115
[58] Field of Search ........................................ 260/115

[56] References Cited

U.S. PATENT DOCUMENTS 2,921,989  1/1960  Serrell ................................. 360/115
3,140,471  7/1964  Fuller .................................. 360/115

Primary Examiner—George G. Stellar
Attorney, Agent, or Firm—Robert F. Cody

[57] ABSTRACT

A magnetic head has an array of cores the transducer gaps of which are aligned in a row. Each core—unlike most prior art cores—has a high reluctance back gap; and bridging the back gap of all such cores is a common magnetic wire. Pursuant to the invention, a domain wall is created in the film on the magnetic wire; and such domain wall is thereafter caused to propagate along the length of the wire. Whenever the domain wall resides in the back gap of a given core in the array of cores, that back gap has low reluctance, thereby turning ON the core in question. All other cores remain OFF until the propagating domain wall resides at their respective back gaps.

7 Claims, 3 Drawing Figures

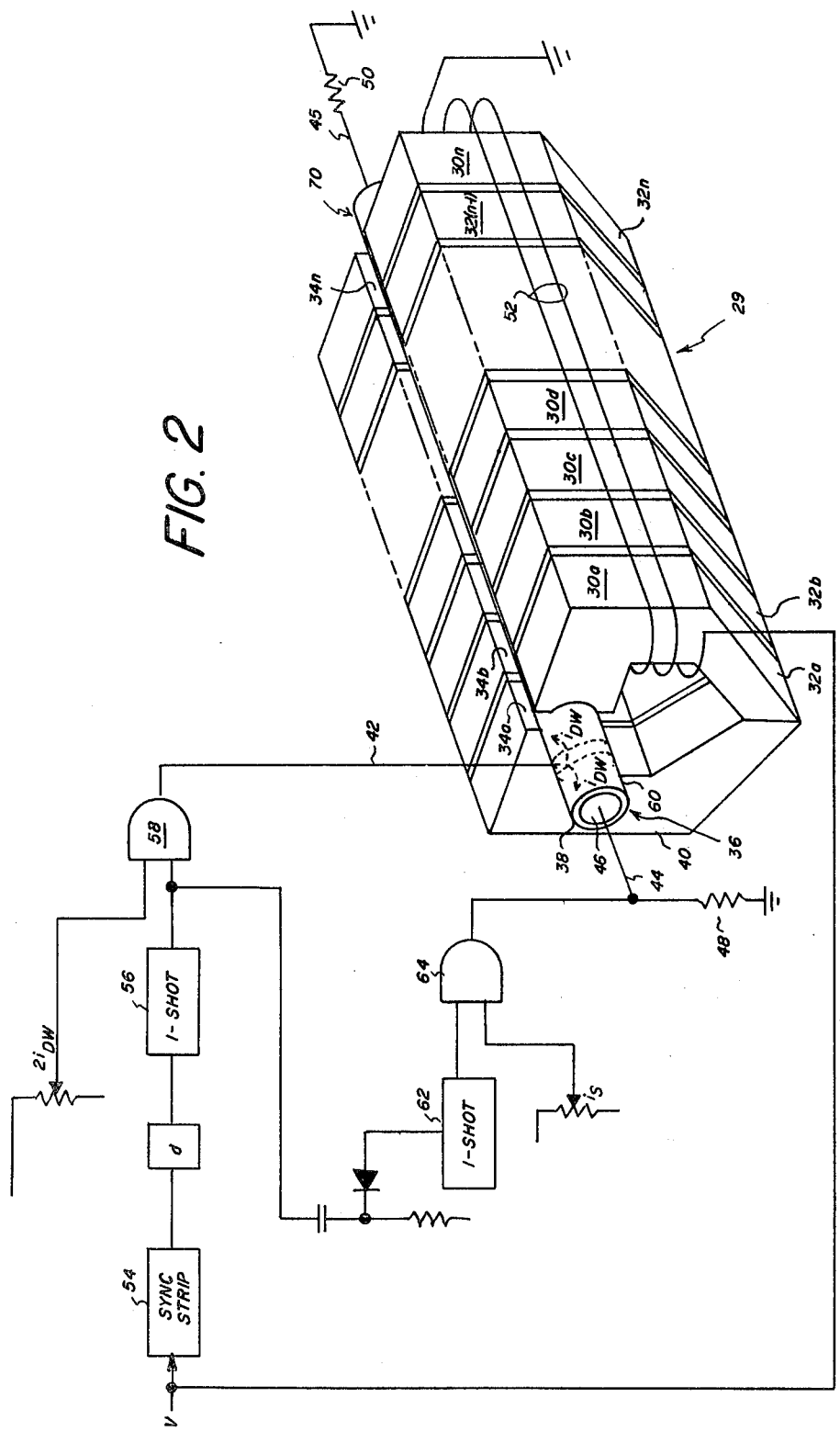

SCANNING MAGNETIC HEAD WITH PROPAGATING DOMAIN WALL

BACKGROUND OF THE INVENTION (1) Field of the Invention

This invention relates in general to magnetic heads and in particular to so-called multitrack scanning magnetic heads.

(2) Description Relative to the Prior Art

The traditional form for a magnetic head—say a single-track record head—is a gapped mangetic core on which a coil of wire is wound. Electrical signal current in the coil induces a magnetic field within the core and, as the flux lines of the field close on themselves, they bridge, and fringe out from, the gap. A magnetic medium in contact with the head at its gap receives the gap fringing field, thereby effecting recording in the medium. Although the traditional form of magnetic head has many uses, there are, however, some instances when it is desirable to provide ancillary control of the recording function, whereby recording may be effected, or not, at will.

A traditional reproduce head similarly is comprised of a gapped magnetic core on which a "reproduce" coil is wound, the dimensions of the "reproduce" gap being, however, often different from the dimensions of the "record" gap. Signal flux patterns in a magnetic medium in contact with such a reproduce head at its gap cause flux to enter the core, link the coil thereon, and exit the core at the gap, thereby inducing signal current in the reproduce coil. Just as there are instances when it is desirable to provide ancillary control of a recording function, there are also instances when it is desirable to provide ancillary control of a reproduce function, i.e., despite the fact that the reproduce gap is in contact with a recorded flux pattern, flux is controllably precluded from coursing the core and linking the reproduce coil.

With the above as background, consider for a moment a multitrack magnetic record head comprised of a stack of head cores with their respective gaps aligned along a gap line; and imagine, for example, a common signal-carrying coil linking all such cores. By successively turning ON and OFF, each core in the stack by means of some ancillary means, each core will take a time-division sample of the signal in the common coil . . . and if the line of core gaps is in contact with a recording medium (magnetic tape), a plurality of time-division samples will be recorded in respective tracks of the medium. Such a process has been desired by those in the video recording field for some time, whereby the whole concept of linear video recording would become commercially practicable. By time-division sampling of, say, an NTSC video signal, each picture element of each line could be recorded in a respective track at a low relative head-to-tape speed, thereby obviating the need for the high relative head-to-tape speeds which are common to helical scan and quadruplex recorders. In a similar way, playback of such a multitrack recording could be effected by successively switching ON, and OFF, the cores in the stack, thereby to induce, successively, corresponding element signals in the common coil which links the cores.

The recording and playback of "video" signals are but two representative uses for the whole idea of ancillary control of the record and reproduce functions; and, obviously, many other uses may be contemplated, as well.

As will appear below, the invention utilizes to advantage the existence of a domain wall in a thin magnetic film: A domain wall in a magnetic film is a region thereof which exists between magnetizations of different orientation. Two kinds of domain walls are known to exist, i.e. Block and Neel walls, and either is applicable to the practice of the invention. With a Block wall, the magnetization vector rotates in the plane of the wall; a Neel wall, on the other hand, while existing between magnetizations of different orientation, involves a change from one magnetization orientation to another in such a way that the magnetization vector within the wall rotates in a plane formed by a vector parallel to the wall and vector perpendicular to the wall. Domain walls, as is known, may be created, destroyed, and positioned by various techniques.

In a preferred implementation of the invention, use is made of structures known as "magnetic wire memories". Such structures, which are hereinafter simply called "magnetic wires", comprise a thin film of circumferentially oriented magnetic material, e.g. permalloy, coated on an electrically conductive wire. Magnetic wires may be obtained from the Sperry Rand Corporation and General Electric Co.; and various uses for them are disclosed in U.S. Pat. Nos. 3,495,230; 4,120,011; 4,123,790; 4,136,371; 4,137,554; and 4,164,770.

With the above as background, the invention will now be summarized as follows:

SUMMARY OF THE INVENTION

The invention provides a magnetic head having an array of cores the transducer gaps of which are aligned in a row. Each core—unlike most prior art cores—has a high reluctance back gap; and bridging the back gap of all such cores is a common magnetic wire. Pursuant to the invention, a domain wall is created in the film on the magnetic wire; and such domain wall is thereafter caused to propagate along the length of the wire. Whenever the domain wall resides in the back gap of a given core in the array of cores, that back gap has low reluctance, thereby turning ON the core in question. All other cores remain OFF until the propagating domain wall resides at their respective back gaps. It will be appreciated, therefore, that—in a configuration as has been identified—the cores of a multitrack magnetic head are "magnetically" scanned; and if such head has a common signal-carrying coil linking all such cores, time-division sampling of any signal within the coil will be effected by means of the propagating domain wall.

Figure 3:
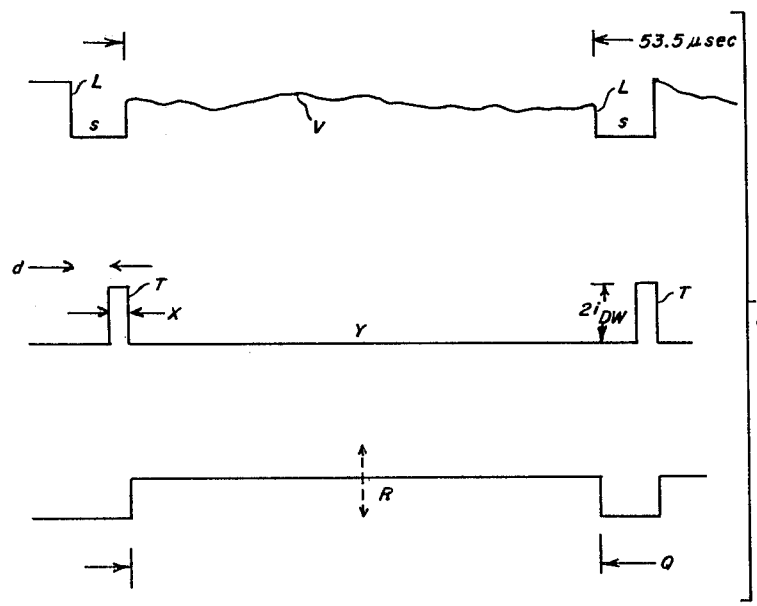

The invention will now be described with reference to the figures wherein:

FIG. 1 is a diagram useful in explaining the workings of apparatus according to the invention, FIG. 2 is a partially schematic perspective view illustrating a magnetic head employing the invention, and FIG. 3 is a set of wave-train diagrams useful in explaining the operation of the apparatus of FIG. 2.

Reference should now be had to FIG. 1: A magnetic wire 10 having a thin film 12 of circumferentially oriented magnetic material, e.g. permalloy, coated on an electrically conductive cylindrical center 14, is indicated. The film 12 includes a domain wall 16 therein which separates two regions 18,20 of oppositely oriented magnetization I, the hysteretic properties of the film being reflected in the square hysteresis curve below. It will be appreciated that, inherently, a thin magnetic film 12 such as depicted in FIG. 1 is either saturated in one direction (+I), or in another (−I), depending on location vis-a-vis the domain wall 16. To each side of the domain wall 16, the corresponding slope (dI/dH) of the I-H curve is zero. Thus, since permeability $\mu$ equals $$\left(1 + 4\pi \frac{dI}{dH}\right),$$

the permeability of the film 12 on either side of the domain wall 16 is that of air, viz. equal to 1. Within the interior of the domain wall 16, however, the permeability of the film is, inherently, much greater than 1, i.e. $\mu \gg 1$.

Pursuant to the invention in one form thereof, the domain wall 16 is created by means of a current $2i_{DW}$ which is injected into the magnetic wire at a point P. As the current splits to flow in opposite directions, it sets up corresponding oppositely-oriented circumferential fields. (The current, it will be appreciated, must be such that the fields so produced are greater than the coercivity $H_c$ of the film 12.) Attendantly, the domain wall 16 occcurs. Having produced the domain wall 16, the current $2i_{DW}$ is then interrupted. Thereafter, a current $i_S$—insufficient to cause destruction on the domain wall 16—is applied to the conductive center 14 of the magnetic wire 10. The current $i_S$, because it sets up a circumferential field that additively and subtractively co-acts with the magnetization of the film 12 on opposite sides of the domain wall 16, causes the domain wall 16 to sweep down the length of the magnetic wire 10. The rate at which the domain wall 16 sweeps along the length of the wire 10 is directly dependent on the magnitude of the current $i_S$; and propagation rates as high as $3.6 \times 10^4$ inches per second have been indicated in the literature (Charles Peters, IEEE Transactions on Electrical Computers, EC-14, No. 2, April 1965, page 196).

Given the above teaching concerning the creation of a domain wall, its propagation, and its permeability vis-a-vis the film which gives rise to the wall, consideration should now be given to the structure of FIG. 2: A multitrack magnetic head 29, comprised of a succession of gapped magnetic cores 30a–30n... each core having respective front and back gaps 32a–32n and 34a–34n. The front gaps 32 are aligned with each other, as are the back gaps 34. A magnetic wire 36, having a thin film 38 coated thereon, resides within the back gaps 34; and such wire is contiguous with each of the cores to each side of their respective back gaps 34. In the embodiment depicted, the magnetic wire extends a bit beyond the face 40 of the core 30a, thereby to permit easy connection of an electrically conductive lead 42 thereto, electrically conductive leads 44,45 being connected to the electrically conductive center 46 of the wire 36. The leads 44,45 are grounded via respective resistors 48,50; and a common coil 52 links all cores of the head.

To facilitate understanding of the workings of the invention, the invention is casted in the environment of a scanning multitrack video head... although, it will be appreciated, this is but one use of the invention. Indeed, as will be understood, the invention is applicable to any situation involving a multitrack head in which the individual cores thereof are successively rendered operative, whether for recording or playback purposes. With the above caveat in mind, therefore, consider a video signal V (see FIG. 3) applied to the common coil 52 of the head 29, and to a sync stripper circuit 54 of any well-known type. In response to the leading edge L of the video sync pulse S, the sync stripper circuit 54 produces a spike pulse which, after a suitable delay d, triggers the operation of a one-shot circuit 56. The one-shot circuit 56 produces a pulse of relatively short duration (corresponding to the duration X of the waveform Y of FIG. 3); and such pulse is applied to turn ON a gate circuit 58 through which a current $2i_{DW}$ is adapted to flow. When flowing, the current $2i_{DW}$ branches to flow through each of the resistors 48,50, thereby creating a domain wall 60 in the manner discussed above. Having produced the domain wall 60, the one-shot pulse terminates, its trailing edge T serving to trigger a second one-shot circuit 62.

The one-shot circuit 62 produces a relatively long duration pulse (corresponding to the duration Q of the waveform R of FIG. 3); and such pulse is applied to turn ON a gate circuit 64 through which a current $i_S$ is adapted to flow. When flowing, the current $i_S$ causes the domain wall 60 to sweep successively from one core 30 to another. Since the propagating domain wall 60 has a permeability far in excess of one (as contrasted with the rest of the thin film 38), whenever the domain wall resides in the back gap of a given core 30, that back gap (and no other) is "magnetically" short-circuited. Thus, the propagating domain wall successively turns ON the cores 30 of the head 29, as desired.

When the domain wall 60 reaches the end 70 of the magnetic wire 36, it self-destructs. To repeat the scanning of the head cores 30, therefore, the pulsing of the gate circuits 58 and 64 is repeated, whereupon the domain wall is recreated, and then swept from one core back gap to another.

Since the invention, as in FIG. 2, is cast in the environment of a video scanning head, it is incumbent in such case for the domain wall propagating speed to match the video rate. That is, since there are $53.5\mu$ seconds between video horizontal sync pulses, it is necessary that the cores of the array be swept in precisely $53.5\mu$ seconds. Assuming there are to be 200 picture elements (pixels) per video line, the head 29 will have 200 cores, ... each core corresponding to a given numbered pixel: Pixel No. 1 is recorded by core No. 1 in track No. 1; pixel No. 2 is recorded by core No. 2 in track No. 2; and so on. Were the domain wall to propagate at a rate not in conformity with the video rate, different numbered pixels in the different video lines would be scrambled among the recording tracks. Therefore, to provide for correspondence between the scanning and video rates, the magnitude of the scan-producing current $i_S$ is adjustable, such being reflected in the dashed arrow associated with the waveform R of FIG. 3.

The invention has been described in detail with particular reference to preferred embodiments thereof, but it will be understood that variations and modifications can be effected within the spirit and scope of the invention.

What is claimed is:

1. Magnetically actuable apparatus comprising
   (a) a plurality of magnetic structures having respective high reluctance gaps therein, each of said magnetic structures being actuable when its respective high reluctance gap is magnetically short-circuited, (b) means supporting a thin magnetic film of the type in which a domain wall may exist between regions thereof which are magnetically saturated in differing directions, said means being disposed to reside in the gaps of said plurality of magnetic structures in such a way that said thin film extends from one side to the other of each said gap, (c) means for effecting a domain wall in said thin magnetic film, and (d) means for positioning said domain wall so that it resides within and across one or another of the gaps within said plurality of magnetic structures, whereby the relatively high permeability of the thin film within the domain wall thereof effectively actuates the magnetic structure the gap of which is magnetically short-circuited by said domain wall at any given time, said means supporting a thin magnetic film being an electrically conductive wire having a circumferentially oriented thin film of magnetic material thereon, and said means for effecting a domain wall in said thin magnetic film being means coupled to said wire at a point thereof between its opposite ends for effecting a current flow within said wire that is either simultaneously toward or simultaneously away from the opposite ends of said wire, whereby when said current flow within said wire is of sufficient strength a domain wall is effected within said thin magnetic film as the fields produced by said current flow respectively reenforce and counter the quiescent circumferential orientation of the magnetic material that forms said film.

2. The apparatus of claim 1 wherein said domain wall positioning means is means for selectively passing current from one end of said wire to the other, thereby to sweep any domain wall within said thin magnetic film from the gap of one magnetic structure to the gap of another.

3. A multitrack magnetic head structure comprising (a) a plurality of magnetic cores each having a transducer gap and a high reluctance back gap, the transducer gaps of said cores being arranged along a gap line, (b) a magnetic wire comprised of an electrically conductive center and a thin film of circumferentially oriented magnetic material thereon, said magnetic wire being contiguous with said cores and being adapted to reside within their respective back gaps, (c) means for effecting a circumferential domain wall in said thin film of magnetic material on said magnetic wire, and (d) means for conveying current through the conductive center of said magnetic wire from one end thereof to the other, thereby causing said domain wall to sweep successively from one core to another and, in so doing, magnetically short-circuit the respective back gaps of said cores, said means for effecting a circumferential domain wall being an electrical contact to said magnetic wire for conveying current toward the opposite ends of said magnetic wire, or for receiving current from the opposite ends of said magnetic wire, whereby a domain wall is effected within said thin magnetic film in proximity to said contact.

4. The magnetic head of claim 3 including means for varying the level of current conveyed through the conductive center of said magnetic wire, thereby to vary the rate at which said domain wall is swept from core to core.

5. A multitrack magnetic head for recording and/or playing back signals comprising (a) a plurality of magnetic cores having respective transducer gaps and back gaps, (b) a magnetic wire of circular cross section, said wire being comprised of an electrically conductive center and having a thin film of circumferentially oriented magnetic material thereon the back gap of each core being defined by a pair of facing poles each of which is arcuately grooved, said magnetic wire being disposed to reside within the grooves of all said cores, (c) means for effecting a circumferential domain wall in the thin magnetic film on said magnetic wire, said means being means coupled to said wire at a point thereof between its opposite ends for effecting a current flow within said wire that is simultaneously toward or simultaneously away from the opposite ends of said wiring, and (d) means for applying a current to the electrically conductive center of said wire to cause said domain wall to sweep from core to core, thereby sucessively magnetically short-circuiting the back gaps of said cores to actuate said cores.

6. The magnetic head of claim 5 including means cooperative with said means for applying current to the electrically conductive center of said wire for varying the level of said current to regulate the rate at which said cores are swept into actuation.

7. The magnetic head of claim 6 including a coil commonly inductively coupled to the cores of said head, said coil being adapted to carry either record signal current or reproduce signal current, the sweeping of said cores into actuation serving accordingly to effect time-division sampling of either a signal to be recorded or a signal being played back.

* * * * *